United States Patent [19]

Kafer

[11] Patent Number: 5,896,121
[45] Date of Patent: Apr. 20, 1999

[54] DATA-DEPENDENT COLOR DISPLAY FOR VECTORSCOPES

[75] Inventor: Warren G. Kafer, Hillsboro, Oreg.

[73] Assignee: Tektronix, Inc., Wilsonville, Oreg.

[21] Appl. No.: 08/558,070

[22] Filed: Nov. 13, 1995

[51] Int. Cl.$^6$ .................................... G09G 1/00
[52] U.S. Cl. .................. 345/135; 345/133; 345/431; 345/432
[58] Field of Search .................. 345/133, 134, 345/135, 154, 139, 119, 82, 16, 22, 431, 432; 348/186, 180, 651, 652

[56] References Cited

U.S. PATENT DOCUMENTS

| | | | |
|---|---|---|---|
| 3,906,480 | 9/1975 | Schwartz et al. | 345/135 |
| 4,364,080 | 12/1982 | Vidovic | 345/134 |
| 4,523,221 | 6/1985 | Chin et al. | 348/651 |
| 4,729,098 | 3/1988 | Cline et al. | 345/139 |
| 4,751,660 | 6/1988 | Hedley | 345/135 |
| 5,175,614 | 12/1992 | Proebstel | 348/168 |
| 5,283,561 | 2/1994 | Lumelsky et al. | 345/119 |
| 5,572,236 | 11/1996 | Feig et al. | 345/154 |
| 5,589,877 | 12/1996 | Ikuzawa et al. | 348/186 |

Primary Examiner—Steven J. Saras
Assistant Examiner—John Suraci
Attorney, Agent, or Firm—Francis I. Gray

[57] ABSTRACT

A data-dependent color display for vector data separates chrominance from a video signal as a pair of orthogonal chrominance components. The pair of chrominance components are used as addresses to access a vector memory. An intensity value at the location within the vector memory accessed by the chrominance pair of addresses is incremented by each such access. During a display cycle the intensity values from the vector memory are converted into color values as a function of their locations within the vector memory. The color values are displayed in a display area on a display screen to provide a colored vector display where the color at any point along the vector display is a function of the point's angular position with respect to a center of the display and distance from the center. A decay function may be applied periodically to the intensity values, and a varying color border may be provided for the display area where the color at any point along the border is a function of that point's angular position with respect to the center. Alternatively the display area may be colored to represent color space and the intensity values are displayed in contrasting white or black against such background.

4 Claims, 2 Drawing Sheets

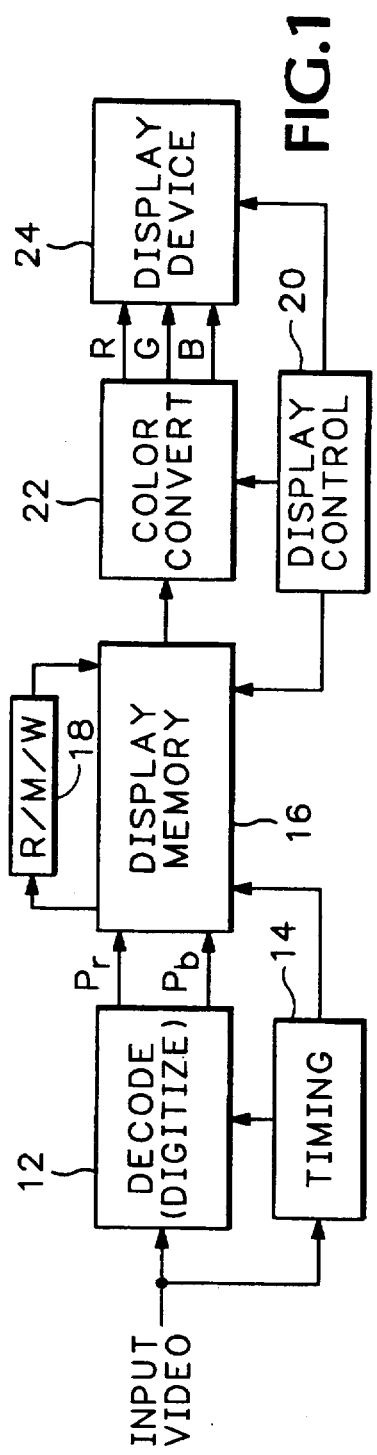

DATA-DEPENDENT COLOR DISPLAY FOR VECTORSCOPES

BACKGROUND OF THE INVENTION

The present invention relates to vector data displays, and more particularly to a data-dependent color display for vectorscopes that provides a more intuitive display for an artistic user.

One type of vector data display device commonly used in the television industry for displaying the color parameters of a television video signal is a vectorscope. The chrominance component of the video signal is divided into two orthogonal chrominance components. The orthogonal chrominance components are input to the respective x- and y-axis drive circuits to drive a display on a suitable display device, such as a cathode ray tube, liquid crystal display or the like. Information about the color content of the video signal is represented by vectors on the display device that emanate radially from a center point. For calibration purposes small squares are scribed, either mechanically or electrically, at specified locations on the display device that represent standard saturated colors, such as red, green, blue, yellow, cyan and magenta. However for vectors that don't end within those squares the color content is a guess based upon experience as the display devices provide only a binary type of display—one color for the background and another color for the vectors, usually monochrome white over black or green over black depending upon the type of display device being used.

What is desired is a more intuitive vector data display that is data-dependent so that a user can readily determine the color content of a video signal without having to guess.

SUMMARY OF THE INVENTION

Accordingly the present invention provides a data-dependent color display for vectorscopes that represents color content of a video signal accurately to a user. A video signal is divided into its orthogonal chrominance components which are used to address a display memory. The location accessed by the chrominance addresses is incremented. When the display memory is read out for display, the locations having a non-zero value are converted to the color corresponding to their address in the memory and displayed accordingly. For each display cycle the locations having non-zero values may be decremented in the display memory by an appropriate decay algorithm. For picture-in-picture raster displays a varying color border may be added around the vector display area corresponding to the color represented by a color vector extending to the border. Alternatively the display area may be colored to represent color space, and the color vector may be displayed as a monochrome color or an inverse of the corresponding color in color space.

The objects, advantages and novel features of the present invention are apparent from the following detailed description when read in light of the appended claims and attached drawing.

BRIEF DESCRIPTION OF THE DRAWING

FIG. 1 is a block diagram of a vectorscope that provides a data-dependent color display according to the present invention.

FIG. 2 is a diagram of a layout for a display memory according to the present invention.

DESCRIPTION OF THE PREFERRED EMBODIMENT

Figure 3:
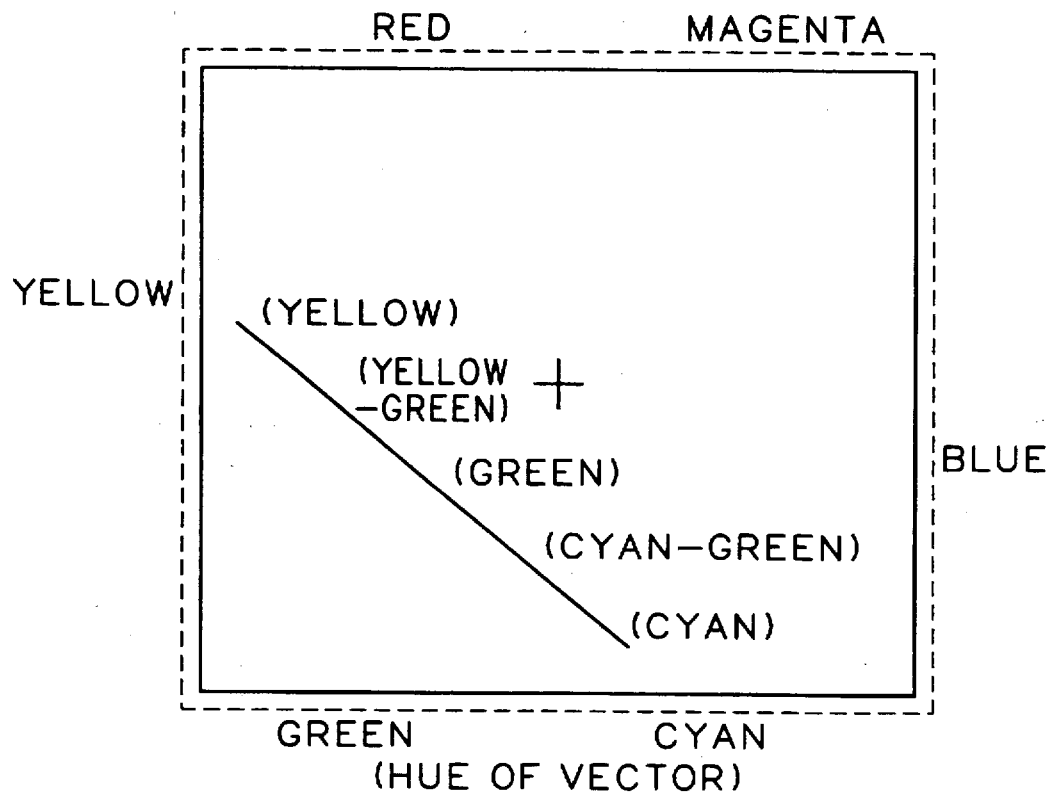
FIG. 3 is a plan view of a display according to the present invention.

Referring now to FIG. 1 an input video signal is input to a decoder circuit 12 which provides as outputs a pair of digitized orthogonal chrominance components, such as R-Y ($P_r$) and B-Y ($P_b$). A timing circuit 14 also receives the input video signal and generates timing signals for the decoder circuit 12. The pair of digitized orthogonal chrominance components are used as addresses to a display memory 16. The contents of the memory 16 at the locations accessed by the addresses in response to timing signals from the timing circuit 14, and are input to a read/modify/write circuit 18 where the intensity values are increased for each such access. As shown in FIG. 2 the memory 16 is laid out, for example, with R-Y addresses along one axis and B-Y addresses along the other so that each location in the memory represents a specific color (hue and saturation). When the contents of the memory 16 are displayed in raster scan format in response to addresses from a display controller 20, the intensity values and addresses are input to a color converter 22, which may be in the form of a lookup table, and the appropriate corresponding RGB signals are output to drive a color display device 24, such as a CRT, LCD or the like, for each non-zero intensity value location. As the memory 16 is read out under the control of the controller 20, the intensity values also may be input to the read/modify/write circuit 18 where they are decremented for each display cycle or otherwise periodically according to a decay algorithm. The result is a vector display as shown in FIG. 3 where the background is black or monochrome, but a vector itself assumes the color of the color it represents at each point along the vector. Thus the vector from yellow to cyan starts as being yellow and progresses through green at the middle to cyan at the end. Each point on the vector corresponds to a location in the display memory 16 where the intensity value is not zero. The non-zero intensity value may act as an enable signal for a lookup table, i.e., the color converter 22, to provide the color output corresponding to the memory 16 location.

Figure 4:
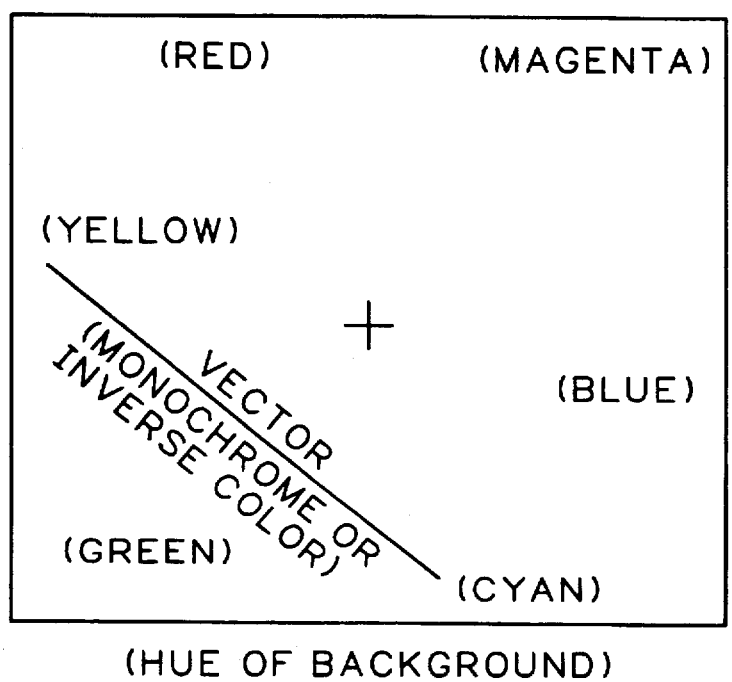
FIG. 4 is a plan view of a display according to another embodiment of the present invention.

Another means of displaying a vectorscope display is electronically cutting it into a video image, as is well known in the art, to produce a picture-in-picture display. For such picture-in-picture vectorscope displays a border may be added surrounding the display area with a color that varies around the border according to the hue corresponding to a vector from the center of the display to the border. Another alternative is to initialize the background of the display to represent color space, as shown in FIG. 4 so that each point in the display has a color corresponding to its relationship to the origin in hue and saturation. Then when the chrominance addresses access the memory 16, the read/modify/write circuit 18 replaces the color value at that location with a monochrome contrasting color, such as black or white, or with an inverse color.

Although described above as a hardware implementation, if the video signal is already in digital form, a software implementation may be used to perform the same function as the corresponding hardware using an appropriate computer processor with associated memory, as is well known in the art.

Thus the present invention provides a data-dependent color display for a vectorscope, either standalone or picture-in-picture, that intuitively indicates the color associated with each color vector displayed by either coloring the vector according to the color it represents, or providing a background that is colored to represent color space.

What is claimed is:

1. A method of providing a data-dependent color vector data display for a video signal having a pair of orthogonal chrominance components comprising the steps of:

sampling the pair of orthogonal chrominance components to generate for each sample pair a pair of addresses for a vector memory;

incrementing an intensity value at each location in the vector memory accessed by the address pairs;

converting the intensity value at each location in the vector memory into a color value for display, the color values being dependent upon the locations and intensity values; and displaying the color values from the converting step within a display area on a display screen to produce the data-dependent vector data display.

2. The method according to claim 1 further comprising the step of periodically decrementing the intensity values in the vector memory according to a specified decay algorithm.

3. The method according to claim 1 further comprising the step of generating a color border around the display area, the color border varying in hue around the display area as a function of angular position about a center point of the display area.

4. A data-dependent color vector display device for a video signal comprising:

means for decoding the video signal to produce a pair of digitized orthogonal chrominance component signals;

a display memory having the digitized orthogonal chrominance component signals applied as addresses for accessing locations within the display memory;

means for incrementing an intensity value at each location accessed by the digitized orthogonal chrominance component signals; and means for displaying the intensity values from the display memory as colors on a display surface as a function of the locations of the intensity values within the display memory.

* * * * *